Dec. 4, 1956　　　G. J. SCOLES　　　2,773,199
ELECTRICAL PULSE GENERATING CIRCUIT ARRANGEMENTS
Filed Aug. 15, 1955

INVENTOR
Graham John Scoles
By Morris & Bateman
ATTORNEYS

United States Patent Office 2,773,199
Patented Dec. 4, 1956

2,773,199

ELECTRICAL PULSE GENERATING CIRCUIT ARRANGEMENTS

Graham John Scoles, East Sheen, London, England, assignor to Metropolitan-Vickers Electrical Company Limited, London, England, a British company Application August 15, 1955, Serial No. 528,307

Claims priority, application Great Britain August 20, 1954

4 Claims. (Cl. 307—108)

This invention relates to electrical pulse generating circuit arrangements.

Pulse generator circuit arrangements are known and usually comprise an artificial line or pulse forming network which is charged through an inductance from a D. C. supply source, in some cases through a rectifier to prevent current reversal, and then discharged through a suitable switching device to produce the pulse.

Such a system is normally satisfactory but if the power handled or the recurrence frequency of the pulses is increased unduly the switch deionisation characteristics become more important and there is a risk that the circuit may trip out due to the network recharging before the switch has deionised and thereby causing a short-circuit D. C. path from the supply source through the inductance and switch.

The main object of the invention is to provide an improved arrangement in which pulses of large power may be generated without the risk of "firing through" above referred to.

According to the present invention a pulse generating circuit arrangement comprises a pair of substantially similar pulse forming networks having their output ends interconnected through a load transformer together with switching means whereby a D. C. voltage may be applied to the input end of each network in turn recurrently, in each case leaving the input end of the opposite network open, the arrangement being such that the applied voltage is connected to the two networks in opposite sense so that the pulses in the load transformer secondary always occur in the same direction.

It will be appreciated that after the initial pulse each switching operation reverses the charges.

Preferably the load transformer has a pair of separate primary windings respectively interconnecting the output terminals of one network with the output terminals of the other.

The primary windings are preferably oppositely connected so that the induced currents in the secondary aid each other.

According to one arrangement the two networks are of the kind comprising a chain of sections of series inductance and shunt capacitance whilst the transformer primary windings cross connect the corresponding output terminals of the two lines.

Figure 1:
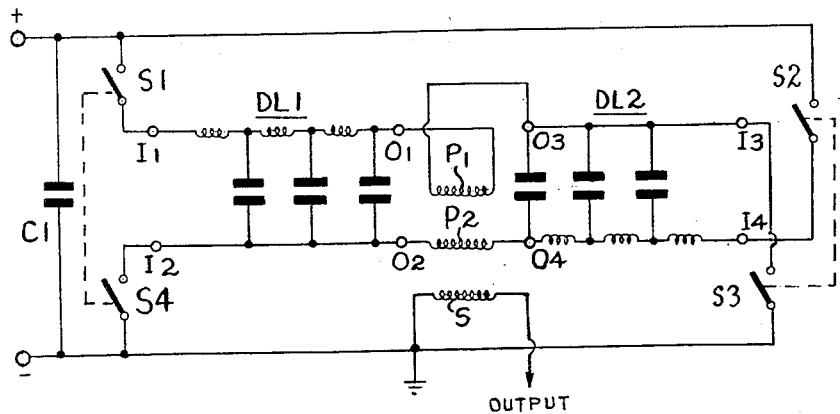
Figure 2:
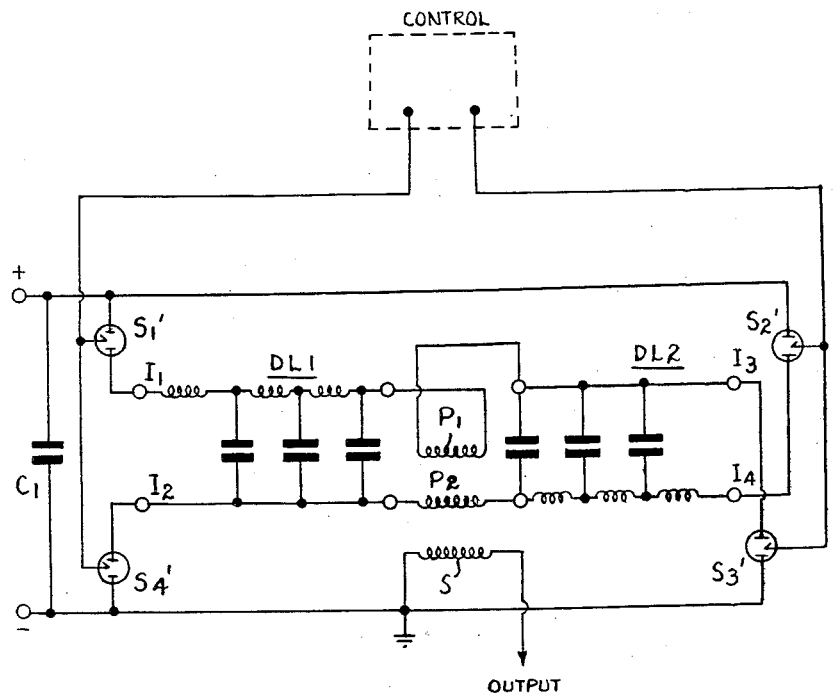

In order that the invention may be more clearly understood reference will now be made to the accompanying drawing in which Figs. 1 and 2 show two embodiments of the invention.

In Fig. 1 the two networks are indicated by the references DL1 and DL2. Each network comprises a chain of sections of series inductance and shunt capacitance. The network DL1 has input terminals $I_1$, $I_2$ and output terminals $O_1$, $O_2$ whilst the network DL2 has input terminals $I_3$, $I_4$ and output terminals $O_3$, $O_4$. The output terminals of these networks are inter-connected through the primary windings P1 and P2 of a load transformer, the secondary winding S of which transformer is connected to a load circuit for example a magnetron. The switches S1, S2, S3, and S4 are indicated diagrammatically as mechanical switches. These are adapted to connect the input terminals of the networks across the + and − terminals of a D. C. supply source whilst a large reservoir condenser C1 is also connected across the same supply terminals. The switches S1 and S4 are preferably synchronised so that they operate together and similarly the switches S2 and S3 are preferably synchronised. Assuming that C1 is charged initially and the switches S1 and S4 are now closed, a travelling wave of amplitude V will transverse DL1 from left to right. On reaching the junction point with the transformer, the discontinuity would cause the voltage V to double if terminals $O_1$, $O_2$ were open circuited, but with the circuit shown this double voltage 2V would be split between DL1, the open ended network DL2 and the two primary windings P1 and P2 in series. If for example the impedance of each network is Z and P1 and P2 are chosen to match in 2Z from the load then $$\frac{2V}{2}$$

would occur across the secondary winding S in the form of a pulse whose duration is twice the electrical length of each network, this assumes that the transformer has unity ratio, i. e. that the number of turns of the secondary winding S equals the combined number of turns of the two primary windings P1 and P2.

If now S1 and S4 are opened and S2 and S3 are closed so that the voltage V is connected across the right hand end of DL2, DL2 will act as a four-terminal network and DL1 as an open-ended network. It will be appreciated that in this case the two networks have already been charged so that a pulse will be produced whose amplitude is 2V due to the reversal of polarity. Further due to the functions of the two networks being interchanged the travelling waves now flow from the opposite direction so that the output pulse is not reversed in polarity. After the initial pulses all subsequent pulses will be of a voltage 2V and all of the same polarity.

It will be appreciated that it is not essential to the invention for the primary winding to be split into two halves nor for the network DL2 to be inverted as shown. However, the arrangement shown is preferred as it is symmetrical in all respects.

A pulse generator according to the invention reduces the risk of "firing through" as there are always two switches in series and moreover any individual switch is only used on alternate pulses. Furthermore, a charging inductance and diode are unnecessary for this arrangement.

Also it will be appreciated that each pulse automatically recharges both the networks in readiness for the next pulse so that it is not necessary to allow charging times between the pulses as in many pulse generators.

Furthermore any individual switch only operates in alternate pulses thus making for increased life and reduced heat dissipation of the switches.

Fig. 2 shows a similar arrangement but in which the switches S1, S2, S3 and S4 are constituted by triggered discharge tubes such as thyratrons or spark gap devices which would deionise after each period of conduction and the present invention allows the maximum possible time for this deionisation to occur.

What I claim as new and desire to secure by Letters Patent of the United States is:

1. An electrical pulse generating circuit arrangement comprising a pair of substantially similar networks, a load circuit interconnecting one end of each of said networks, the opposite ends of said networks being normally open circuited, a source of direct voltage and means for connecting said voltage source to the opposite ends of said two networks alternately so as to generate recurrent unidirectional pulses in the load circuit.

2. An electrical pulse generating circuit arrangement comprising a pair of substantially similar pulse forming networks, input and output ends to each of said networks said input ends being normally open circuited, a load transformer, a primary winding to said load transformer interconnecting the output ends of said two networks, a secondary winding to said load transformer, a source of direct voltage and means for connecting said voltage alternately to the input ends of said two networks in a sense to generate recurrent unidirectional pulses in the load transformer secondary.

3. An electrical pulse generating circuit arrangement comprising a pair of substantially similar pulse forming networks, input and output ends to each of said networks said input ends being normally open circuited, a load transformer, primary winding means to said load transformer interconnecting the output ends of said two networks, a secondary winding to said load transformer, a source of direct voltage, an electronic switching means for connecting said voltage source to the input ends of said two networks alternately and in a sense to generate recurrent unidirectional pulses in the load transformer secondary.

4. An electrical pulse generating circuit arrangement comprising a pair of substantially similar pulses forming networks, each of said networks comprising a chain of sections of series inductance and shunt capacitance, input and output ends to each of said networks, a pair of terminals to each of said network ends, a load transformer, a pair of primary windings to said load transformer said windings cross connecting corresponding output terminals of the two networks, a secondary winding to said load transformer, a source of direct voltage and switching means for connecting said direct voltage source to the input ends of said two networks alternately whilst maintaining the input end of the other network open circuited, the connections being such that recurrent unidirectional pulses are generated in the load transformer secondary winding.

No references cited.